United States Patent
Ramamurthy (10) Patent No.: US 6,304,565 B1
(45) Date of Patent: Oct. 16, 2001

(54) METHOD OF COMPLETING LONG DISTANCE POTS CALLS WITH IP TELEPHONY ENDPOINTS

(75) Inventor: Ram S. Ramamurthy, Manalapan, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/082,245

(22) Filed: May 20, 1998

(51) Int. Cl.⁷ .................................................. H04L 12/66
(52) U.S. Cl. ......................... 370/352; 370/353; 370/354; 370/355; 370/356
(58) Field of Search ..................................... 370/352, 353, 370/354, 355, 356; 379/100.12, 100.15

(56) References Cited

U.S. PATENT DOCUMENTS

| | | |
|---|---|---|
| 4,995,074 | 2/1991 | Goldman et al. . |
| 5,274,700 | 12/1993 | Gechter et al. . |
| 5,363,431 | 11/1994 | Schull et al. . |
| 5,428,608 | 6/1995 | Freeman et al. . |

(List continued on next page.)

FOREIGN PATENT DOCUMENTS

| | | |
|---|---|---|
| WO 95/18501 | 7/1995 | (WO) . |
| 0758175A1 | 2/1997 | (WO) . |
| WO 97/14238 | 4/1997 | (WO) . |
| WO 97/16007 | 5/1997 | (WO) . |

(List continued on next page.)

OTHER PUBLICATIONS

Hewlett Packard The Internet Telephony Red Herring, 1996, 15pages.
International Switching Symposium, Oct. 25–30, 1992, vol. 2, 32 pages.
Babbage et al, Internet Phone—Changing the Telephony Paradigm, 17 pages.

Primary Examiner—Wellington Chin
Assistant Examiner—Brenda H. Pham (57) ABSTRACT

When a calling party calls a called party on the public-switched telephone network (PSTN), a database common to both the PSTN and an Internet Protocol (IP) network, is accessed to determine whether the called telephone line is currently active on the IP network. That database maintains a record for each user who is currently active on the IP network through an Internet Service Provider (ISP). In addition, each record contains information identifying the particular user logged into the network on that line, an indication whether the telephone line is IP telephony capable, an indication whether that line is currently active on an IP telephony call on an Internet Telephony network (ITN), and the IP telephony feature set subscribed to by the called party on that line. If the telephone line is active, IP telephony capable, currently active on an IP telephony call on the ITN, and the called party subscribes to a call waiting-on-IP feature, then the incoming call can be forwarded as an IP telephony call to the called telephone line over the ITN. Alternatively, the incoming call can be directed to an alternate destination on either the ITN network or the PSTN, such as a voice mail or message service. If the called party is engaged in a browsing activity and has an IP telephony capability, then the called party is alerted to the incoming telephone call via a message on his terminal. The incoming call is then completed through the ITN to the called party as an Internet telephony call. If the called party is currently active on the IP network through an ISP, but does not have an IP telephony capability, then the PSTN forwards a message to the ISP, which pushes a message to the called party to inform him or her of the incoming call. The incoming call is then be directed onto the IP network to a messaging service, or on the PSTN to a voicemail service, or to an alternate telephone number, such as a cellular phone, for pickup by the called party.

35 Claims, 6 Drawing Sheets

U.S. PATENT DOCUMENTS

| | | |
|---|---|---|
| 5,533,110 | 7/1996 | Pinard et al. . |
| 5,712,907 | 1/1998 | Wegner et al. . |
| 5,724,412 | 3/1998 | Srinivasan . |
| 5,742,596 | 4/1998 | Baratz et al. . |
| 5,751,706 | 5/1998 | Land et al. . |
| 5,768,513 | 6/1998 | Kuthyar et al. . |
| 5,870,565 | 2/1999 | Glitho . |
| 5,894,504 | 4/1999 | Alfred et al. . |
| 5,896,444 | 4/1999 | Perlman et al. . |
| 5,916,302 | 6/1999 | Dunn et al. . |
| 5,946,381 | 8/1999 | Danne et al. . |
| 6,011,909 | 1/2000 | Newlin et al. . |
| 6,075,783 * | 6/2000 | Voit ........................ 370/352 |
| 6,219,413 * | 4/2001 | Burg ........................ 379/215 |

FOREIGN PATENT DOCUMENTS

| | | |
|---|---|---|
| WO 97/37483 | 10/1997 | (WO) . |
| WO9747118 | 12/1997 | (WO) . |
| WO 98/01985 | 1/1998 | (WO) . |
| WO 98/52332 | 4/1998 | (WO) . |
| WO 98/52339 | 5/1998 | (WO) . |

* cited by examiner

METHOD OF COMPLETING LONG DISTANCE POTS CALLS WITH IP TELEPHONY ENDPOINTS

TECHNICAL FIELD

This invention relates to a method of completing a call to a called party whose telephone line is being used for an Internet telephony call or a connection to the Internet.

BACKGROUND OF THE INVENTION

Use of the Internet has increased dramatically in the past several years. There has been a tremendous explosion in its use by both adults and children from the home environment for retrieving information, making transactions for the purchase of advertised goods and services, engaging in chat room conversations, and general browsing or "surfing the Net", as it is commonly known. These activities have replaced television-viewing in many households. Access to the Internet is most frequently provided to a user's terminal through an Internet Service Provider (ISP), which can be accessed by the user over the user's Plain Old Telephone Service (POTS) connection through their Local Exchange Carrier (LEC). The Internet has also become a medium over which telecommunications can take place using what is known as Internet Telephony. With respect to the latter, telecommunication takes place via a terminal or a telephone set over an IP Telephony Network (ITN) rather than the Public Switched Telephone Network (PSTN). In an ITN, voice signals are transmitted via digital IP voice packets rather than via circuit-switched digital voice signals, as on the PSTN. Gateways at each end of the IP telephony call interconnect the PSTN and the ITN and translate voice signals into packets for transmission on the ITN and packets into voice signals for transmission on the PSTN.

With such a time-intensive use of one's telephone line for Internet-related activities, an incoming telephone call directed to such a heavy Internet user's telephone number will have great difficulty in being completed. In fact, it is not uncommon for a calling party to experience a busy signal for hours on end as he or she attempts to reach a household where the telephone line is kept busy with such activities. Eventually a calling party's frustration becomes disgust and he or she gives up in their attempt to reach their intended called party, with a loss of revenue to the telephone company for the incomplete call. The recent flat-rate pricing by several major Internet Service Providers has even exacerbated the problem since users have no financial incentive to minimize their time connected to an Internet Service Provider. Various solutions to this problem have been proposed. An obvious solution for the heavy Internet user is to subscribe to a separate telephone line that can be used exclusively for Internet telephony and other Internet-related activities. The disadvantage, of course, is the extra monthly cost incurred by the subscriber for the additional telephone line. In co-pending patent application Ser. No. 08/562,678, filed Nov. 27, 1995, a method is disclosed for completing a call over an IP Telephony network. The disclosed method relies on subscribing to call waiting/call forwarding features on the telephone line and depends on a remote access call forwarding capability. In co-pending patent application Ser. No. 08/625,963, filed Apr. 1, 1996, an Internet on-hold method is disclosed in which the telephone network, upon receipt of an incoming call to an Internet-busy telephone line, informs the ISP serving the called party of the incoming call and, upon acceptance by the called party, places the Internet call on hold and forwards the incoming call to the called party over the PSTN onto the telephone line to the called party.

A methodology is desirable that enables a called party to receive an incoming call while his or her POTS telephone line is busy on an Internet-related activity, such as an IP Telephony conversation or "surfing the Net", and which methodology does not require call waiting/call forwarding or Internet-on-hold features on the telephone line.

SUMMARY OF THE INVENTION

In accordance with the present invention, when a calling party calls a called party on the PSTN, a database that is common to both the PSTN and an Internet Protocol (IP) network, is accessed to determine whether the telephone line of the number being called is currently active on the IP network. That database maintains a record for each user who is currently active on the IP network through an Internet Service Provider. In addition, each record contains information identifying the particular user logged into the network on that line, an indication whether the telephone line is IP telephony capable, an indication whether that line is currently active on an IP telephony call, and the IP telephony feature set subscribed to by the called party on that line. If the telephone line is active, IP telephony capable, currently active on an IP telephony call, and the called party subscribes to a call waiting-on-IP feature, then the incoming call can be forwarded as an IP telephony call to the called telephone line if the called party agrees to accept the incoming call and places his current IP telephony call on hold. If the called party does not subscribe to a call waiting-on-IP feature but subscribes to a call forwarding-on-IP feature, the incoming call can be directed to an alternate destination on either the IP network or on the PSTN, such as a voice mail or message service. If the called party is currently active on the IP network, has an IP telephony capability, but is not currently active on an IP telephony call, which is the common scenario when the called party is browsing, then the called party is alerted to the incoming telephone call via a message on his terminal. The called party can then elect to accept the incoming call, and the call is completed through the ITN to the called party as an Internet telephony call regardless whether or not the called party subscribes to a call waiting-on-IP feature. If the called party is currently active on the IP network through an ISP, but does not have an IP telephony capability, then the PSTN can forward a message to the ISP which will push a message to the called party to inform him of the incoming call. The incoming call can then be directed onto the IP network to a messaging service, or on the PSTN to a voicemail service, or to an alternate telephone number, such as a cellular phone, for pickup by the called party. In all cases, if the called party rejects the incoming telephone call, a busy signal is returned to the calling party.

DETAILED DESCRIPTION

Figure 1:
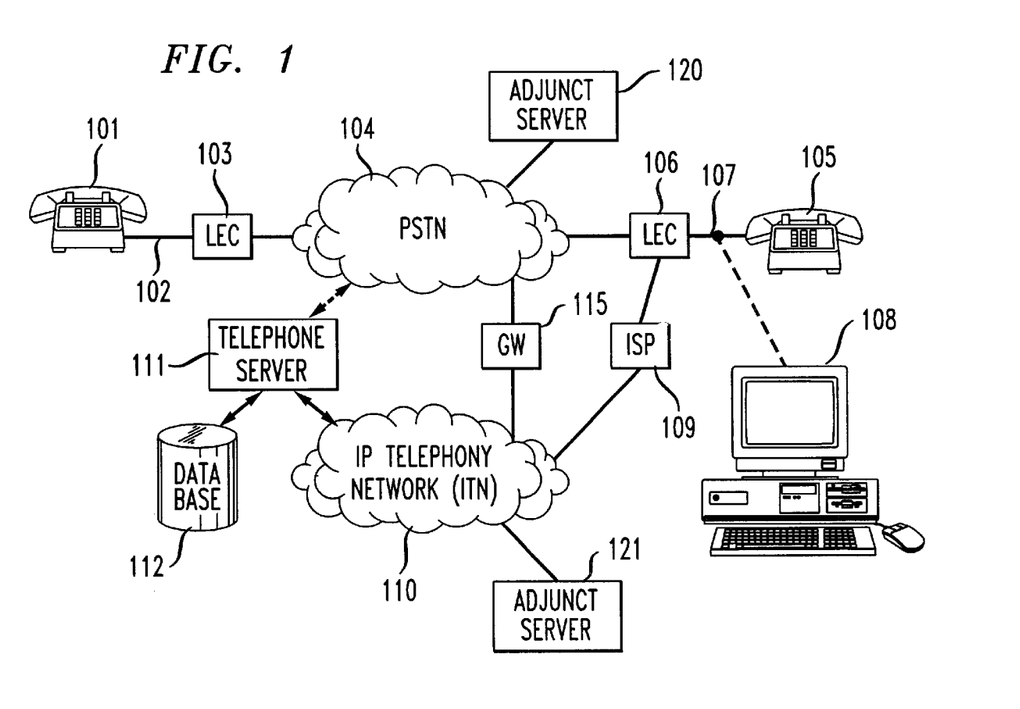
FIG. 1 is a block diagram showing how, in accordance with the present invention, a call from a calling party on a PSTN can be diverted to an Internet Telephony network when the called party has an Internet telephony capability and is currently engaged on his telephone line in an Internet telephony call or an Internet browsing activity.
Figure 2:
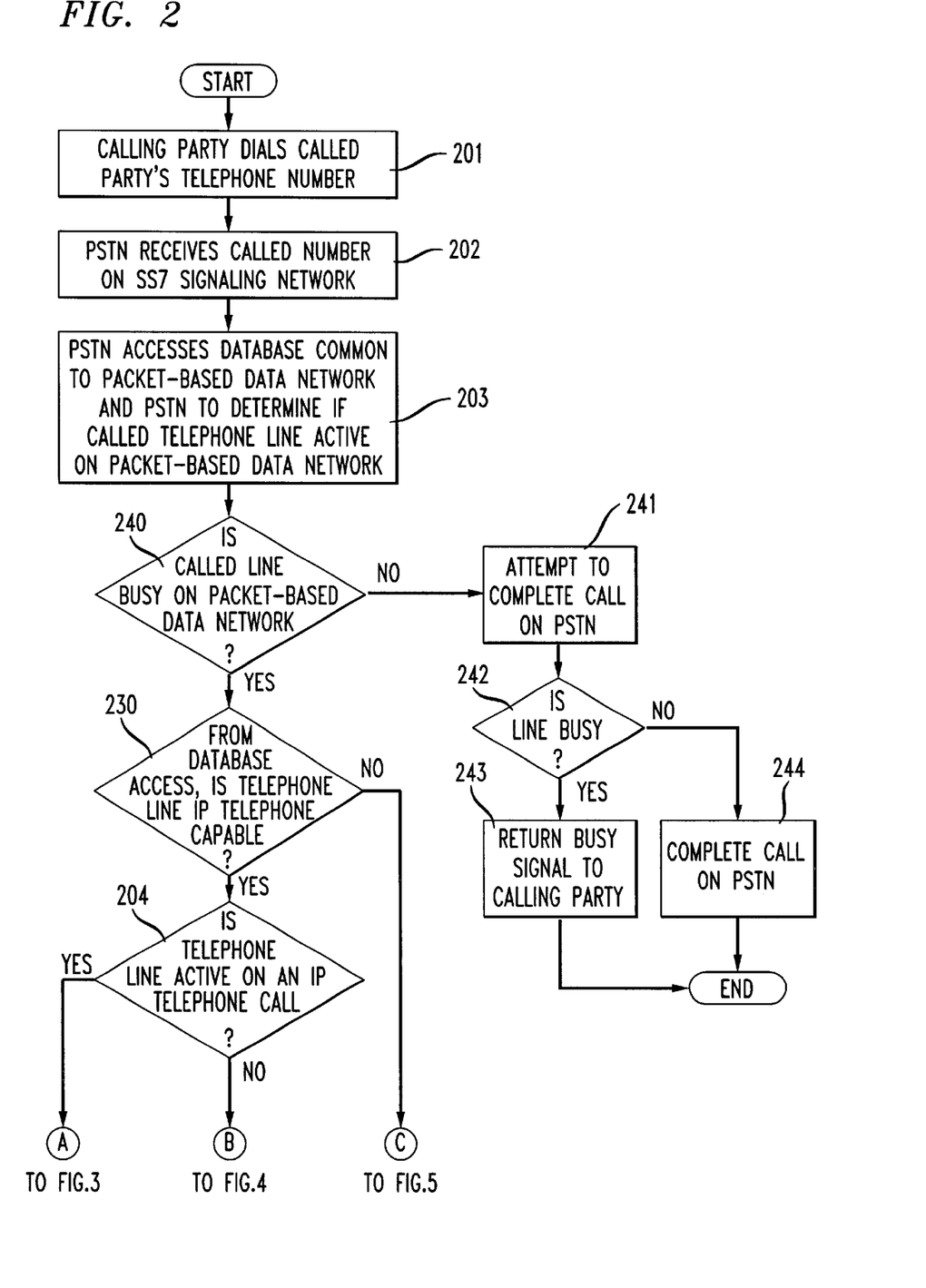
FIGS. 2–5 together are a flowchart detailing, in accordance with the present invention, the steps of completing a call directed to a called party who is busy on his telephone line on an Internet-related activity.
Figure 3:
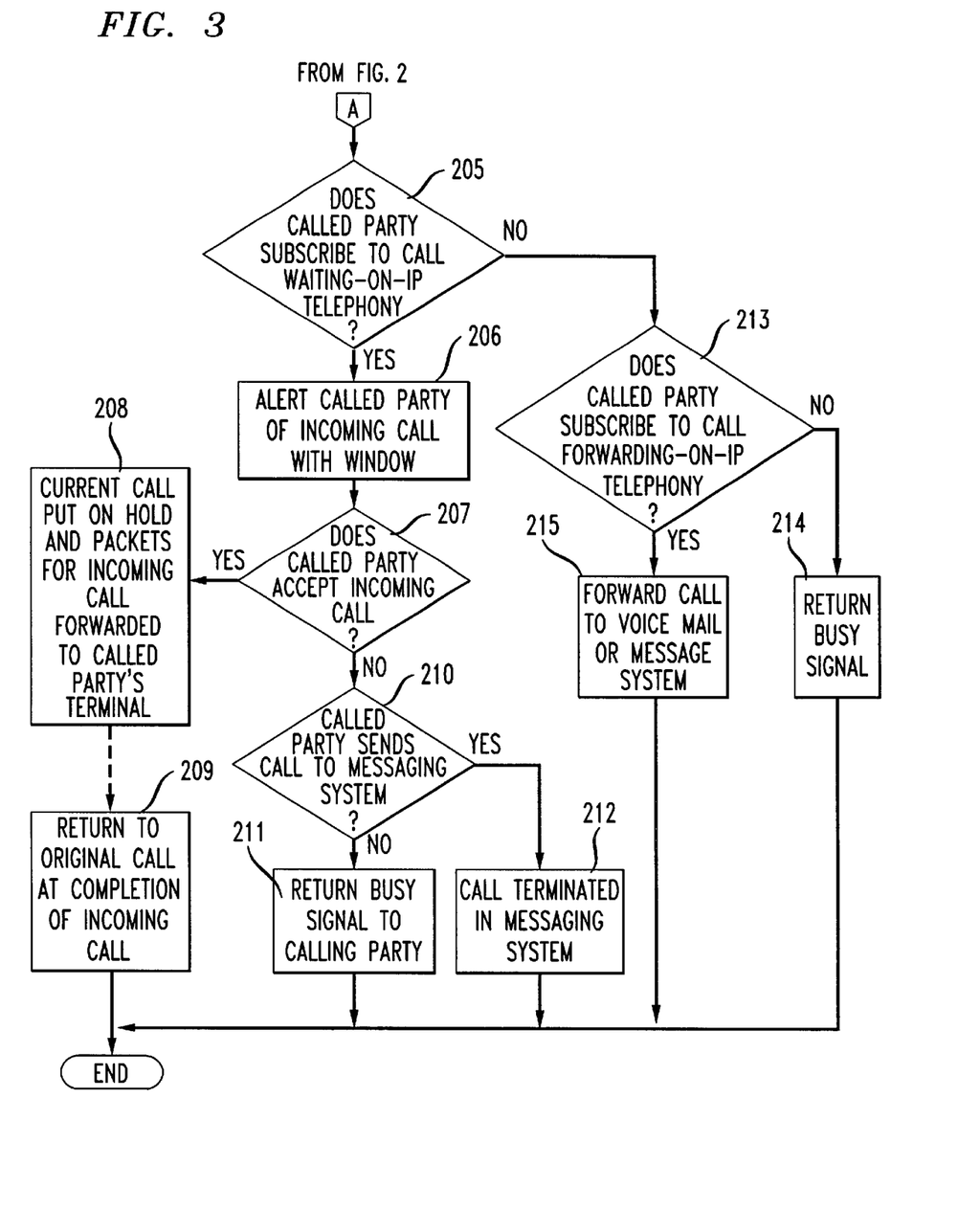
Figure 4:
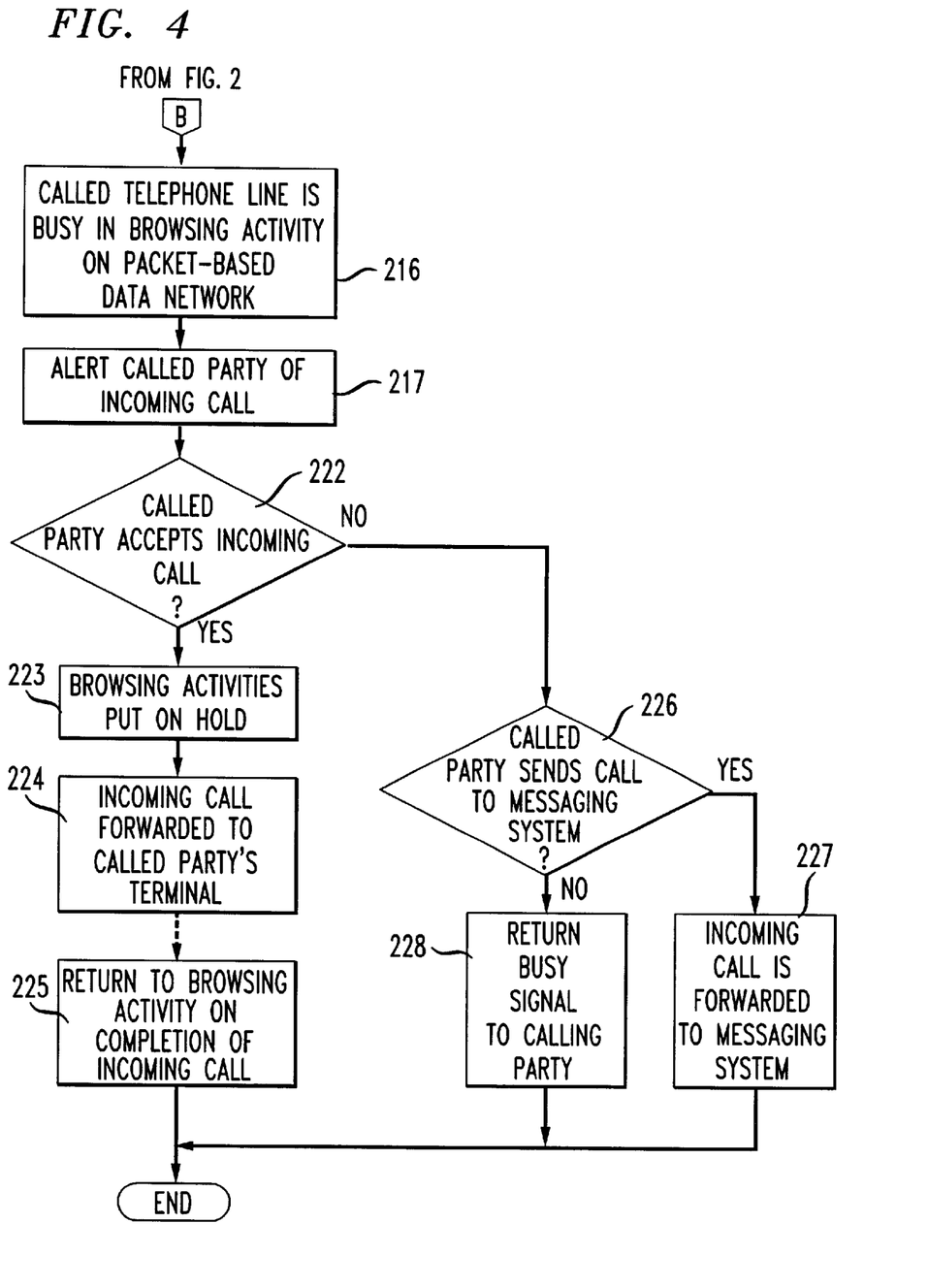
Figure 5:
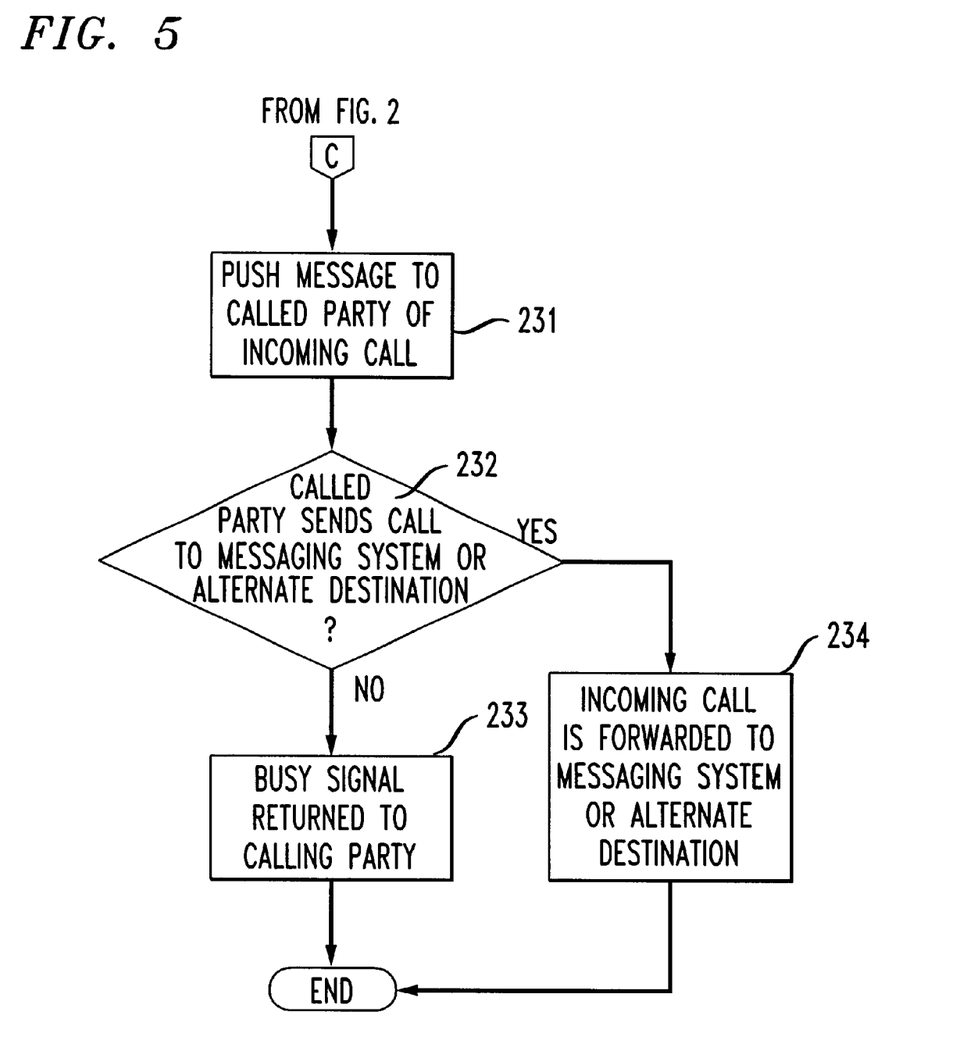

With reference to FIG. 1, a telephone station 101 is connected over a conventional telephone loop 102 to a Local Exchange Carrier (LEC) 103. The LEC 103, in turn, is connected to a long distance Public Switched Telephone Network (PSTN) 104. Telephone calls directed to a telephone connected to a LEC outside the local area serviced by the calling telephone's LEC traverse a PSTN, such at the AT&T network. Thus, a telephone call from telephone station 101 directed to telephone station 105 is connected from LEC 103 to PSTN 104 to LEC 106 onto the telephone line 107 to which the called station is connected. In a conventional prior art system, without the benefit of the present invention, when telephone line 107 is busy, regardless of the type of call that is ongoing there over, the terminating switch in LEC 106 returns a busy signal through PSTN 104 and LEC 103 to telephone station 101, to inform the calling party that the called telephone line is busy and that the call cannot be presently completed.

Telephone line 107 may be busy as a result of a telephone call with a user of telephone set 105 and a user at another station on the POTS telephone network. Alternatively, telephone line 107 may be busy via a terminal 108 on an Internet telephony call established through LEC 106 to an Internet Service Provider 109 and thence to an Internet Telephony Network 110. If telephone line 107 is busy from such an Internet-related connection, the present invention enables an incoming telephone call to be routed over the ITN 110 to the called party's terminal 108 in a manner that will be described in detail hereinafter.

ITN 110, as illustrated in FIG. 1, is accessed through a data connection through ISP 109. In actuality ISP 109 need not be separate from ITN 110, but may be incorporated within ITN 110 itself. ITN 110 represents a service provider that provides PC-to-PC, phone-to-PC, or phone-to-phone communications over an IP network. An example of such a service is AT&T's Connect'N Save Service. ITN 110 is data network characterized in that it uses the Internet or an Intranet for the packet-based data transmission of IP telephony traffic. It provides a client-server mechanism for PC-based phone calls where both the called and calling parties are client PCs. ITN 110 cooperatively operates with a telephone server 111 for purposes of call setup, call control and call completion. In addition, a database 112 is connected to telephone server 111, in which a list of currently active users on ITN 110 is maintained. As will be described, PSTN 104, by accessing database 112 either directly or through telephone server 111, can determine whether a called telephone line is currently active on the ITN network and whether an incoming call from the PSTN can be routed to the called party's terminal or telephone via the ITN network.

As noted, a client terminal 108 can communicate with another client terminal using IP telephony over ITN 110. Thus, client terminal 108 can engage in an Internet telephony communication with another client terminal similarly connected to ITN 110 through the same or another LEC. A phone-to-phone or phone-to-PC Internet telephony communication can also take place over ITN 110 by means of gateways that interconnect the telephone network and the ITN. Functionally, at one end of a phone-to-phone connection, a gateway converts a digital voice stream from a telephone station set into IP voice packets for transmission over an IP network, and at the other end of the connection another gateway converts IP packets from the ITN network into digital voice signals for transmission over the telephone network. A phone-to-PC connection requires a gateway at only that end of the connection associated with the telephone.

A subscriber at terminal 108 can also access the Internet or an Intranet associated with ITN 110, thorugh ISP 109 and ITN 110 for purposes of browsing.

Telephone line 107 may thus present a busy condition to LEC 106 as a result of: 1) a user of terminal 108 being active on an Internet telephony call being carried over ITN 110; 2) a user on terminal 108 who is actively browsing on the Internet; 3) a user on telephone set 105 who is active on a conventional POTS voice telephone call through LEC 106 and PSTN 104, the latter only if an inter-LATA call; or 4) a data call from a terminal such as, for example, client terminal 108 or a FAX terminal, using a modem for transmission of data over the conventional circuit-switched telephone network. When a user is engaged in either of the first two numbered activities, an incoming telephone call from over PSTN 104 can be diverted to ITN 110 and delivered to that user, as will be described.

In accordance with the invention, when a calling party at telephone set 101 initiates a telephone call to a called party at a telephone number associated with telephone line 107, PSTN 104 signals the telephone server 111 associated with ITN 110 to determine the current status of the called line through the database 112 associated with server 111. Database 112 has stored thereon information associated with each user currently logged on to ITN 110. Specifically, when a user at terminal 108 logs onto the ITN 110, he identifies himself with a user ID. In addition, the user is prompted for the telephone number from which the connection is being established, or that telephone number may be provided to ITN 110 via Automatic Number Identification (ANI) provisioning through LEC 106. Further, database has stored therein information indicating the subscribed-to IP telephony feature set associated with the subscriber/user at the called telephone number, such as call forwarding-on-IP and call waiting-on-IP. When the user at terminal 108 logs onto ITN 110, therefore, a record is created in database 112 which indicates the user's telephone line number, the user's ID, and the IP telephony feature set associated with that user, and the fact that the identified telephone line is active on the IP network. Further, the record indicates whether or not that telephone line is currently active on an IP telephony call. If the called telephone line is active on the IP network but not currently active on an IP telephony call, then the user is either keeping his terminal idle or is browsing on the Internet or an Intranet.

The method of connecting an incoming telephone call from telephone set 101 to terminal 108 will be described in conjunction with the flow chart of FIGS. 2–5. At step 201, the calling party at telephone set 101 dials the telephone number associated with telephone line 107 of the called party. At step 202, the PSTN 104 receives the dialed number over the SS7 signaling network. At step 203, PSTN 104 accesses database 112 through telephone server 111, which is commonly accessible from ITN 110 and PSTN 104, to determine, at step 240, if the telephone line identified by the dialed number is currently active on a packetbased data network. If not currently active, an attempt is made, at step 241, to complete the call through the PSTN. If, at step 242, the called telephone line is busy, at step 243, a busy signal is returned to the calling party. If, at step 242, the called telephone line is not busy, at step 244, the call is completed on the PSTN.

If determined to be currently active on a packet-based data network at step 240, at decision step 230, a determination is made from the retrieved record whether the telephone line has an IP telephony capability. If yes, at decision step 204, a determination is made from the retrieved record whether the called telephone line is currently active on an IP telephony call. If the retrieved record indicates that the called telephone line is currently engaged in an active IP telephony call, the incoming call cannot be completed through normal call processing through the PSTN. An attempt to complete the call can be made, however, using the operational procedures available through ITN 110.

Following is a scenario of an example of an operational procedure available through ITN 110. If the called telephone line is currently active on an IP telephony call, at step 205, a determination is made from the retrieved record whether the called party on the called line subscribes to a call waiting-on-IP telephony feature. If database 112 indicates that the called party does subscribe to an IP telephony call waiting feature then, at step 206, called party, then currently engaged in an IP telephony call, is alerted to the presence of the incoming. Specifically, the called party is alerted to the incoming call by means of a window that pops-up on his terminal's screen. If the ANI identification of the calling party and/or a name associated with that calling number are passed by PSTN 104 to telephone server 111, that information is forwarded by ITN 110 through ISP 109 to the called party's terminal 108 for display in the window that alerts the called party to the incoming call. At decision step 207, the called party, in response to receiving the alerting message as a window on his terminal's display, can either accept the incoming call or choose not to accept the incoming telephone call by clicking on an appropriate icon within the alerting window. If the called party accepts the incoming call, at step 208, the current IP telephony call is placed on hold and the incoming second call is forwarded to the called party. More specifically, in response to receiving the accept signal, telephone server 111 signals ITN 110 to terminate the forwarding of packets to the called party from the original Internet telephony call. PSTN 104 is then signaled to connect the incoming call from telephone set 101 through PSTN 104 to ITN 110. Thus, the circuit-switched telephone call is connected through PSTN 104 to a gateway (GW) 115 that interconnects PSTN 104 and PSTN 110 at a location on ITN that is proximate to the called party. As aforenoted, such a gateway converts the circuit-switched digital voice stream from PSTN 104 to IP voice packets that can be transmitted on ITN 110. These packets are then forwarded to the called party's terminal 108. In the opposite direction, GW 115 converts the IP voice packets transmitted over ITN 110 from terminal 108 to a digital voice signal for transmission over the circuit-switched PSTN 104.

With reference back to FIGS. 2–5, at step 209, at a time determined by the called party, the called party signals ITN 110 via terminal 108 to return the call on hold back to terminal 108. At that point the second incoming call is either placed on hold or is terminated. Once the original call is returned to terminal 108, the packets associated with that call are forwarded via ITN 110 to terminal 108 and the original IP telephony call proceeds until its conclusion.

At step 207, the called party who is busy on an IP telephony call when he was alerted at step 206 to the incoming call via a window pop on his terminal may elect not accept to take the incoming call. The called party is then given the option, at step 210, to forward the incoming call to a messaging system. If the called party does not elect to send the incoming call to a messaging system then, at step 211, the telephone server 111 signals the PSTN 104 to return a busy signal to the called party. If the called party, at step 210, does elect to send the call to a messaging system then, at step 212, the call is terminated in a messaging system at which the calling party can leave a message. Such a messaging system could, for example, be terminated in an adjunct 120 associated with PSTN 104 or an adjunct 121 associated with ITN 110, where at either one the called party can leave a voice message for later retrieval by the called party. Either adjunct can store a voice message or, employing speech-to-text software, a text message. Alternatively, the adjunct could convert the calling party's voice signal to a .WAV file for later retrieval through the called party's terminal.

If, at step 204, the called telephone line is determined to be active on an IP telephony call but a determination was made at step 205 that a call waiting-on-IP telephony feature is not associated with the called party, then, at step 213, a determination is made whether the called party subscribes to a call forwarding-on-IP feature. If not, at step 214, telephone server 111 signals PSTN 104 to return a busy signal to the calling party. If a call forwarding feature-on-IP is associated with the called telephone line then, at step 215, the incoming call can be directed to adjunct 120 or 121, as previously described. Alternatively, the called party can direct that the call be forwarded to an alternate destination on either the ITN or PSTN, such as a cellular telephone.

At step 204, by accessing database 112, a determination is made whether the called telephone line is currently active on an IP telephony call. If the called telephone line is not currently active on an IP telephony call, a determination can be made, at step 216, that the called telephone line is currently active through the ITN in another IP-related activity, such as browsing. At step 217, a message is sent via ITN 110 to the called party's terminal 108, to alert the called party of the incoming telephone call. Such a message can be within a window that is automatically opened to alert the called party of the incoming call and provide caller ID ANI telephone number and/or an associated name of the calling party, if such information is available. If the browsing called party elects, at step 222, to accept the incoming telephone call then, at step 223, the current browsing activities are automatically placed in the background. The call is then forwarded, at step 224, to terminal 108 as an IP telephony call whether or not a call waiting-on-IP feature is associated with the called party. At the conclusion of the incoming telephone call, at step 225, the called party can signal through his browser to return to his browsing activities.

If the alerted browsing called party does not accept the incoming call at step 222 then, at step 226, the called party can elect to send, at step 227, the call to an alternate destination such as a messaging system associated with either the ITN or PSTN, or to another telephone number via the ITN or PSTN. If the called party does not forward the call then, at step 228, a busy signal is returned to the calling party.

Figure 6:
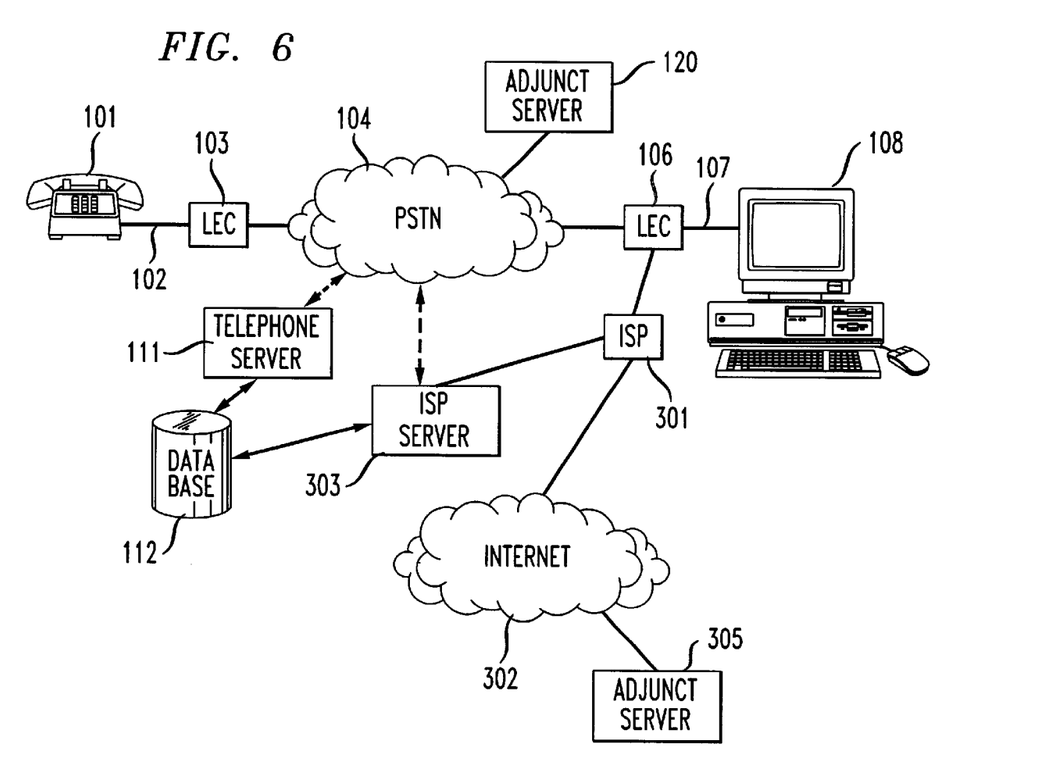
FIG. 6 is a block diagram showing how, in accordance with the present invention, a user without an Internet telephony capability, but who is engaged in an Internet browsing activity, can be alerted to an incoming telephone call.

The discussion hereinabove was conditioned upon the decision, at step 230, that the called telephone line has an IP telephony capability. If the called telephone line does not have such a capability then, with reference to FIG. 6, the called party who is engaged in a browsing activity would be connected via terminal 108 to LEC 106 to an ISP 301, which provides access to the Internet 302. ISP 301 is connected to an ISP server 303, which is connected to the same database 112, previously described in conjunction with FIG. 1. ISP server 303 is also is cooperatively connected with PSTN 104 for purposes of exchanging signaling information there between. When the called party at terminal 108 logs onto ISP 301, ISP server 303 creates a record in database 112 that identifies the user, the telephone line on which he is connected, and the fact that he is engaged in a browsing activity. Further, the record reflects that the called telephone line does not have an IP telephony capability. Thus, when the calling party from telephone 101 places a call to the telephone line 107 of the called party, and PSTN 104 accesses database 112 directly or through telephone server 111, it determines that the called telephone line 107 is currently busy in a browsing activity. The PSTN 104 then sends to ISP 301 via ISP server 303 information relating to the incoming call. ISP 301 will then push a message to the logged-on called party's terminal, which may be acted upon by the called party. The called party can then direct the call to an alternate destination, or to a messaging system, as previously described. Alternatively, a voice prompt can be sent to the calling party informing the calling party that the called party is currently busy in a browsing activity. The calling party can then be offered the opportunity to send a message to the called party for an additional charge. Thus, in conjunction with speech-to-text translation adjunct 120 associated with PSTN 104 or an adjunct 305 associated with Internet 302, a message can be received from the calling party, translated to text, and transmitted to ISP 301, and then pushed to the called party's terminal 108. Alternatively, a message could be converted to a .WAV file and pushed to the called party's terminal 108.

With reference again to the flowchart in FIGS. 2–5, at step 230, a determination from database 112 is made whether the currently IP-active called telephone line has an IP telephony capability. If the called telephone line does not have an IP telephony capability, at step 231, a message is pushed to the called party. At step 232, the called party can elect to send, at step 234, the call to a message system or to an alternate destination. If the called party elects not to send the call to a message system or to alternate destination then, at step 233, then a busy signal is returned to the calling party.

In the embodiment described above, database 112 is accessed before an attempt to complete the call to the called party is made. In an alternative embodiment, an attempt to complete the call to the called telephone line can first be attempted and upon return of a busy tone from the terminating switch, a determination can then be made whether the called line is busy on an IP related activity. Disadvantageously, the time to have such a busy signal returned from the terminating office will delay processing of the call through the ITN to the called party.

The above-described embodiments are illustrative of the principles of the present invention. Other embodiments could be devised by those skilled in the art without departing from the spirit and scope of the present invention.

The invention claimed is:

1. A method of completing an incoming telephone call from a calling party initiated on a circuit-switched telephone network to a called party on a called telephone line, comprising the steps of:
   receiving the incoming telephone call in the circuit-switched telephone network;
   determining whether the called telephone line is busy with an activity on a packet-based data network;
   if the called telephone line is determined to be busy with an activity on the packet-based data network, determining whether the activity on the packet-based data network is one of being active on an Internet telephony call and engaged in an Internet-related browsing activity; and
   attempting to complete the telephone call to the called telephone line over the packet-based data network.

2. The method of claim 1 further comprising, if the called telephone line has an Internet telephony capability, the step of attempting to complete the telephone call as an Internet telephony call to the called telephone line.

3. The method of claim 2 wherein the step of attempting to complete the incoming telephone call as an Internet telephony call comprises the steps of:
   alerting the called party who is active on an Internet telephony call or engaged in an Internet-related browsing activity to the presence of the incoming telephone call from the calling party; and
   determining whether the called party wants to accept the telephone call from the calling party.

4. The method of claim 3 further comprising, if it is determined that the called party wants to accept the telephone call, the step of forwarding the incoming telephone call from the calling party to the called party as an Internet telephony call over the packet-based data network.

5. The method of claim 3 wherein further comprising, if it is determined that the called party does not want to accept the telephone call, the step of forwarding the telephone call from the calling party to a messaging system.

6. The method of claim 5 wherein the messaging system is associated with the circuit-switched telephone network.

7. The method of claim 5 wherein the messaging system is associated with the packet-based data network.

8. The method of claim 3 further comprising, if it is determined that the called party does not want to accept the telephone call, the step of returning a busy signal to the calling party on the circuit-switched telephone network.

9. The method of claim 3 further comprising the step of, if it is determined that the calling party does not want to accept the telephone call, forwarding the telephone call to an alternate destination.

10. The method of claim 3 wherein the method of alerting the called party to the telephone call comprises the step of opening a pop-up window on a terminal associated with the called party within which window information associated with the incoming call is provided.

11. The method of claim 10 wherein the information associated with the incoming telephone call includes the telephone number of the calling party.

12. The method of claim 10 wherein the information associated with the incoming telephone call includes the name of the calling party.

13. A method of completing an incoming telephone call from a calling party initiated on a circuit-switched telephone network to a called party on a called telephone line, comprising the steps of:
   receiving the incoming telephone call in the circuit-switched telephone network;
   accessing a database cooperatively connected to the circuit-switched telephone network and a packet-based data network to determine information associated with the called telephone line, the information stored on the database for the called telephone line including at least one of (1) whether or not the called telephone line is currently engaged in an activity on the packet-based data network; (2) whether or not the called telephone line has an IP telephony capability; (3) whether or not the called telephone line is currently active on an IP telephony call; (4) whether or not a call waiting-on-IP telephony feature is a feature subscribed to by the called party on the called telephone line; and (5) whether or not a call forwarding-on-IP telephony is a feature subscribed to by the called party on the called telephone line; and
   if from accessing the database a determination is made that the called telephone line is currently active on an IP telephony call and that the called telephone line has a call waiting-on-IP feature, attempting to complete the incoming telephone call from the circuit-switched telephone as an Internet telephony call to the called telephone line over the packet-based data network.

14. The method of claim 13 wherein the step of attempting to complete the call as an Internet telephony call comprises the steps of:
   alerting the called party to the presence of the incoming telephone call from the calling party over the packet-based data network; and
   determining whether the called party wants to accept the incoming telephone call from the called party.

15. The method of claim 14 further comprising, if it is determined that the called party wants to accept the incoming telephone call, the steps of:
   placing the current IP telephony call on hold on the packet-based data network; and
   forwarding the incoming telephone call to the called party over the packet-based data network.

16. The method of claim 14 further comprising, if it is determined that the called party does not want to accept the incoming telephone call, the step of forwarding the incoming telephone call to a messaging system.

17. The method of claim 16 wherein the messaging system is associated with the packet-based data network.

18. The method of claim 16 wherein the messaging system is associated with the circuit-switched telephone network.

19. A method of completing an incoming telephone call from a calling party initiated on a circuit-switched telephone network to a called party on a called telephone line, comprising the steps of:
   receiving the incoming telephone call in the circuit-switched telephone network;
   accessing a database cooperatively connected to the circuit-switched telephone network and a packet-based data network to determine information associated with the called telephone line, the information stored on the database for the called telephone line including at least one of (1) whether or not the called telephone line is currently engaged in an activity on the packet-based data network; (2) whether or not the called telephone line has an IP telephony capability; (3) whether or not the called telephone line is currently active on an IP telephony call; (4) whether or not a call waiting-on-IP telephony feature is a feature subscribed to by the called party on the called telephone line; and (5) whether or not a call forwarding-on-IP telephony is a feature subscribed to by the called party on the called telephone line; and
   if it is determined from accessing the database that the telephone line is currently active on an IP telephony call, that the called party does not subscribe to a call waiting-on-IP feature, and does subscribe to a call forwarding-on-IP feature, forwarding the incoming telephone call to a messaging system.

20. The method of claim 19 wherein the messaging system is associated with the packet-based data network.

21. The method of claim 20 wherein the messaging system is associated with the circuit-switched telephone network.

22. A method of completing an incoming telephone call from a calling party initiated on a circuit-switched telephone network to a called party on a called telephone line, comprising the steps of:
   receiving the incoming telephone call in the circuit-switched telephone network;
   accessing a database cooperatively connected to the circuit-switched telephone network and a packet-based data network to determine information associated with the called telephone line, the information stored on the database for the called telephone line including at least one of (1) whether or not the called telephone line is currently engaged in an activity on the packet-based data network; (2) whether or not the called telephone line has an IP telephony capability; (3) whether or not the called telephone line is currently active on an IP telephony call; (4) whether or not a call waiting-on-IP telephony feature is a feature subscribed to by the called party on the called telephone line; and (5) whether or not a call forwarding-on-IP telephony is a feature subscribed to by the called party on the called telephone line; and
   if it is determined from accessing the database that the called telephone line has an IP telephony capability, is not currently engaged in an IP telephony call, and is engaged in a activity on the packet-based data network, attempting to complete the incoming telephone call to the called telephone line over the packet-based data network as an Internet telephony call.

23. The method of claim 22 wherein the step of attempting to complete the incoming telephone call as an Internet telephony call comprises the steps of:
   alerting the called party of the incoming call over the packet-based data network; and
   determining whether the called party wants to accept the incoming call.

24. The method of claim 23 further comprising, if it is determined that the called party wants to accept the incoming call, the step of forwarding the incoming telephone call to the called telephone line as an Internet telephony call.

25. The method of claim 23 further comprising, if it is determined that the called party does not want to accept the incoming call, the step of forwarding the incoming telephone call to a messaging system.

26. The method of claim 25 wherein the messaging system is associated with the packet-based data network.

27. The method of claim 25 wherein the messaging system is associated with the circuit-switched telephone network.

28. A method of completing an incoming telephone call from a calling party initiated on a circuit-switched telephone network to a called party on a called telephone line, comprising the steps of:
   receiving the incoming telephone call in the circuit-switched telephone network;
   accessing a database cooperatively connected to the circuit-switched telephone network and a packet-based data network to determine information associated with the called telephone line, the information stored on the database for the called telephone line including at least one of (1) whether or not the called telephone line is currently engaged in an activity on the packet-based data network; (2) whether or not the called telephone line has an IP telephony capability: (3) whether or not the called telephone line is currently active on an IP telephony call; (4) whether or not a call waiting-on-IP telephony feature is a feature subscribed to by the called party on the called telephone line; and (5) whether or not a call forwarding-on-IP telephony is a feature subscribed to by the called party on the called telephone line; and if it is determined from accessing the database that the called telephone line is currently engaged in an activity on the packet-based data network and does not have an IP telephony capability, attempting to complete the incoming telephone call by pushing a message to the called party over the packet-based data network while the called party is engaged in the activity on the packet-based data network informing the called party of the incoming telephone call.

29. The method of claim 28 further comprising the step of forwarding the incoming telephone call to a messaging system.

30. The method of claim 29 wherein the messaging system is associated with the packet-based data network.

31. The method of claim 29 wherein the messaging system is associated with the circuit-switched telephone network.

32. The method of claim 28 further comprising the step of forwarding the incoming telephone call to an alternate destination specified by the called party.

33. The method of claim 28 further comprising the steps of:

receiving a voice message from the calling party;

converting the voice message to a data file; and pushing the data file to the called party over the packet-based data network.

34. The method of claim 33 wherein the data file is a .WAV file.

35. The method of claim 33 wherein the data file is a text file.

* * * * *